A. J. Foster,
Hames Fastener,
Nº 68,866. Patented Sep. 17, 1867.
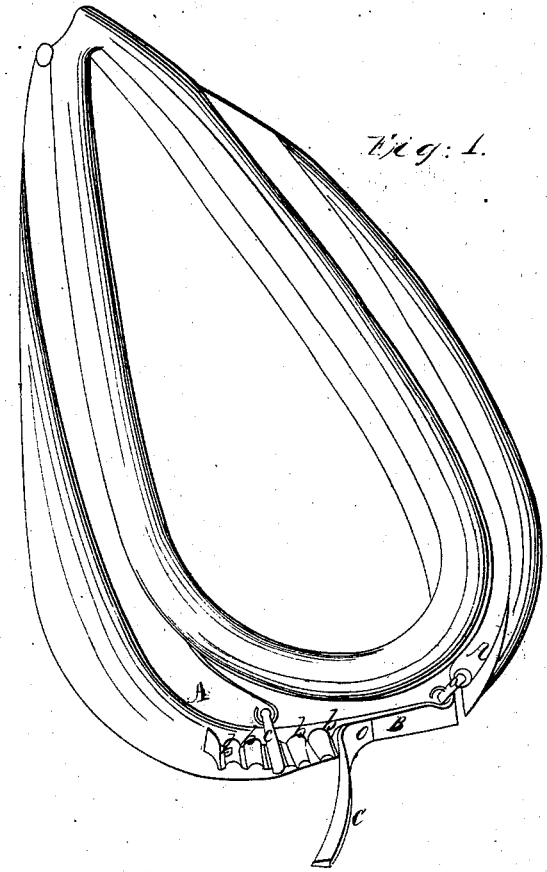
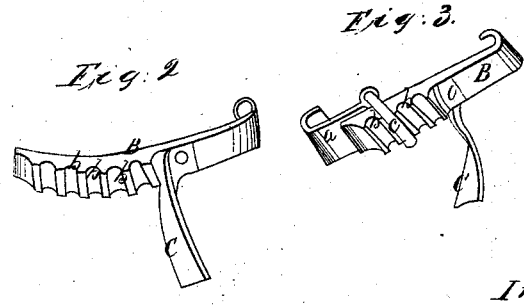
Witnesses:
L. E. Porter
Stephen Savill
Inventor:
A. J. Foster

United States Patent Office.

AMBROSE J. FOSTER, OF LAKE MILLS, WISCONSIN.

Letters Patent No. 68,866, dated September 17, 1867.

IMPROVED HAME-FASTENER.

The Schedule referred to in these Letters Patent and making part of the same.

TO ALL WHOM IT MAY CONCERN:

Be it known that I, AMBROSE J. FOSTER, of Lake Mills, in the county of Jefferson, and State of Wisconsin, have invented a new and useful improved metallic Hame-Fastener; and I do hereby declare and make known that the following is a full, clear, and exact description of the same, reference being had to the accompanying drawings and the letters and figures of reference marked thereon, which form part of this specification, in which—

Figure 1 represents a perspective view of my invention as applied upon the collar.

Figure 2 is a detached view of one part of the fastener, and

Figure 3 is a detached view of the fastener, both parts being represented together.

A represents the hames, extending down each side of the collar, having a bar of metal, B, attached to one end, upon one side of the collar, either by means of a link, $a$, or directly to the hame, in any suitable manner as may be preferred. The outer surface of the said bar is corrugated, or provided with teeth or catches, marked $b$ in the drawings, and inclining back towards the end which is attached to the hame. To the outer end of the hame is secured, either with or without the intervention of a link or hook, $a$, as shown in fig. 3, a clasp or link marked $c$, which, on being properly adjusted upon the bar B, holds the hames together, as desired, the ribs $b$ securing the link $e$ thereto.

By compressing the sides of the hames together the link $c$ is readily attached or detached, and the bar B may be provided with a strap, C, or a metallic projection, to facilitate the proper adjustment of the parts, if desired.

Having described the construction and operation of my invention, I will now specify what I claim, and desire to secure by Letters Patent.

I claim, in combination with the hames A, the metallic strap or bar B, provided with teeth or corrugations $b\ b$ and the link $c$, arranged and operating substantially as and for the purposes specified.

A. J. FOSTER.

Witnesses:
L. E. PORTER,
STEPHEN FAVILL.